United States Patent [19]
Cooperman

[11] Patent Number: 5,471,466
[45] Date of Patent: Nov. 28, 1995

[54] METHOD AND APPARATUS FOR ATM CELL ALIGNMENT

[75] Inventor: Michael Cooperman, Framingham, Mass.

[73] Assignee: GTE Laboratories Incorporated, Waltham, Mass.

[21] Appl. No.: 153,695

[22] Filed: Nov. 17, 1993

[51] Int. Cl.⁶ .................................................. H04J 3/06
[52] U.S. Cl. ..................... 370/58.1; 370/66; 370/105.1; 370/108
[58] Field of Search ............................ 370/105.1, 105.3, 370/105.4, 105.8, 60, 60.1, 100.1, 102; 375/118, 106, 107, 111, 110; 340/825.79, 825.83, 825.85, 825.87, 825.89

[56] References Cited

U.S. PATENT DOCUMENTS

| | | | |
|---|---|---|---|
| 4,045,618 | 8/1977 | Lagarde et al. | 370/105.1 |
| 4,158,107 | 6/1979 | Nicholas | 370/105.1 |
| 4,359,770 | 11/1982 | Suzuka | 370/108 |
| 4,528,854 | 7/1985 | Shimazaki | 73/626 |
| 4,818,988 | 4/1989 | Cooperman et al. | 340/825.85 |
| 5,022,056 | 6/1991 | Henderson et al. | 370/108 |

Primary Examiner—Douglas W. Olms
Assistant Examiner—Huy D. Vu
Attorney, Agent, or Firm—Victor F. Lohmann, III; J. Stephen Yeo

[57] ABSTRACT

An Asynchronous Transfer Mode (ATM) cell alignment assembly aligns an incoming ATM cell within an internal time slot of an ATM matrix by controllably time-delaying the cell before being switched by the matrix. The alignment assembly includes a 53-byte-wide shift register having a serial input receiving the incoming ATM cell, and fifty-three parallel outputs each coupled to a respective input of a 53×8 programmable crosspoint switching array. Each output of the array is coupled to an input of a shift register having eight parallel inputs and a serial output coupled to a respective input of the ATM matrix. The crosspoint switching array establishes only a single selected switching path through the array in accordance with the desired time delay, and is reconfigured upon the arrival of each incoming ATM cell.

4 Claims, 3 Drawing Sheets

METHOD AND APPARATUS FOR ATM CELL ALIGNMENT

FIELD OF THE INVENTION

The present invention, relates to switching systems and, more particularly, to a method and apparatus for input cell alignment in ATM switching.

BACKGROUND OF THE INVENTION

The Asynchronous Transfer Mode (ATM) communications protocol involves organizing and transmitting data in a contiguous 53-byte cell sequence comprising a 5-byte header and a 48-byte information portion. The principal function of an ATM matrix is to transfer the entire 53 bytes as a single unit from one of the inputs to one of the outputs. However, each cell must be presented to the ATM matrix at the beginning of a specified time slot during which the matrix is available for accepting and switching the cell. Otherwise, if a cell is not aligned within the time slot, only that portion of the cell within the time slot will be switched. This cell fragmentation is clearly undesirable since the cell must remain intact when being transferred in an ATM environment.

Accordingly, as each cell arrives from an input network at arbitrary time intervals, a mechanism is needed to delay the cell by an appropriate amount so that the cell is received by the ATM matrix at a time which is coincident with a switching interval of the ATM matrix.

OBJECTS OF THE INVENTION

It is an object of the present invention to obviate the above-noted and other disadvantages of the prior art.

It is a further object of the present invention to provide a mechanism for aligning an ATM cell within a time slot suitable for switching by an ATM matrix.

It is a further object of the present invention to provide a reconfigurable array for transferring incoming ATM cells to an ATM network.

SUMMARY OF THE INVENTION

The present invention relates to an apparatus comprising a shift register having a serial input and a plurality of parallel outputs; and a crosspoint switching array having a plurality of inputs each coupled to a respective one of the shift register outputs, a plurality of outputs, and a plurality of crosspoint switching means arranged in a matrix for selectably connecting any one of said plurality of array inputs to any one of said plurality of array outputs. The apparatus further includes: a shift register having a plurality of parallel inputs each coupled to a respective one of the crosspoint switching array outputs, and a serial output.

In accordance with one embodiment of the present invention, the serial-to-parallel shift register includes fifty-three (53) byte register locations; the crosspoint switching array has fifty-three (53) inputs and eight outputs; and the parallel-to-serial shift register includes eight (8) bit register locations.

DETAILED DESCRIPTION OF THE PREFERRED EMBODIMENTS

The present invention relates to a method and apparatus for controllably imposing a time delay upon a digital signal such that the time-delayed signal becomes aligned within a prespecified time slot. The invention is particularly advantageous in an ATM system where the digital signal corresponds to an ATM cell and the alignment occurs in regard to the internal time intervals of an ATM switch matrix.

Figure 1:
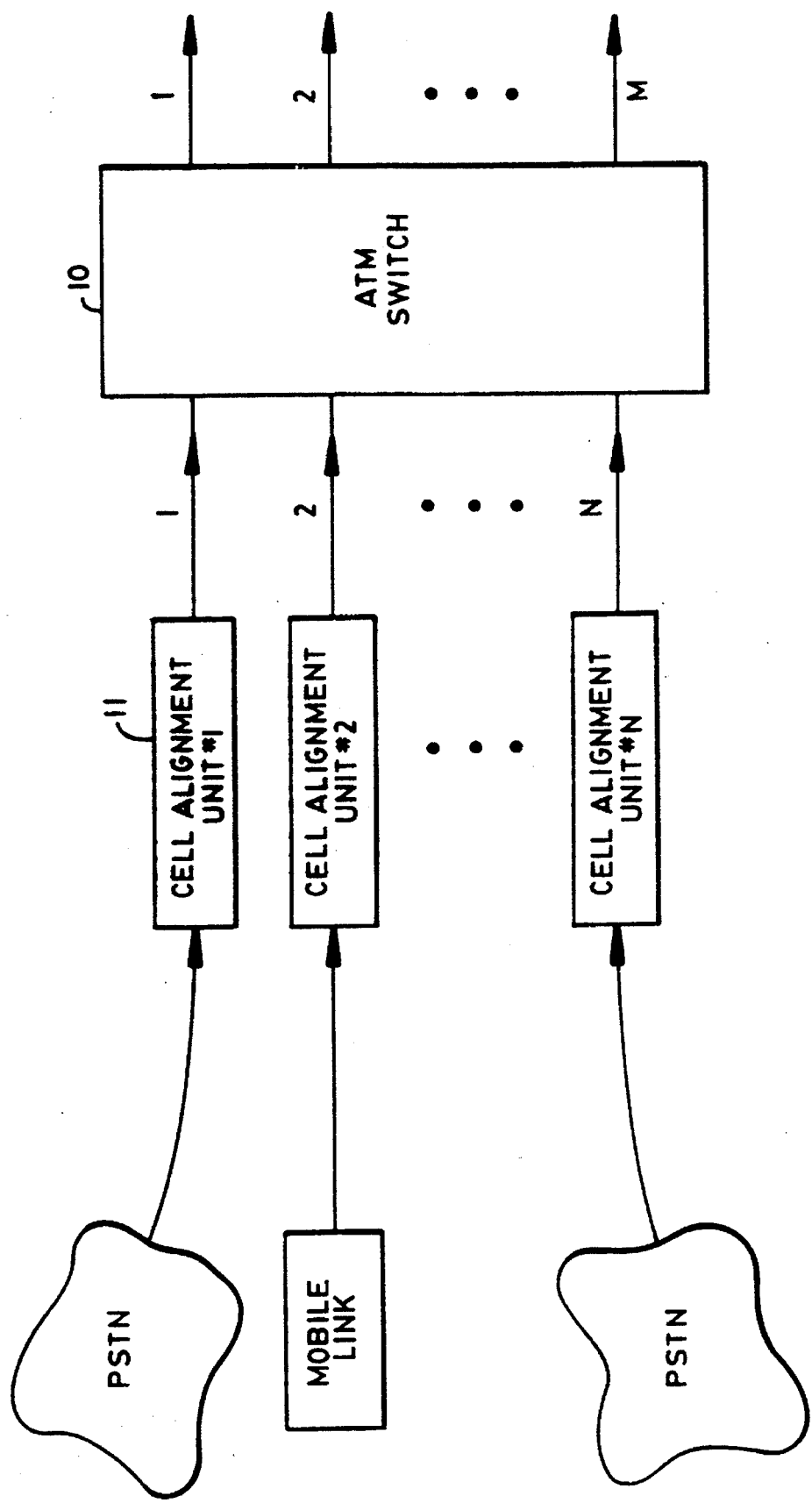
FIG. 1 represents a system level description of an ATM application incorporating a plurality of cell alignment units in accordance with the present invention.

FIG. 1 discloses an ATM system incorporating the cell alignment unit of the present invention. The ATM system, shown illustratively in FIG. 1, includes a plurality of signal generation means which transmit signals to an ATM matrix for switching. For example, signals may be received from the public service telephone network (PSTN) or a mobile link. It should be obvious to those skilled in the art that other signal generation facilities are possible. The signal generation facilities such as the PSTN and mobile site include suitable means for packaging information into the ATM cell format before transmission. The general operation of ATM switch 10 is to receive and switch cells from N different input ports to M output ports.

In accordance with the present invention, a cell alignment unit is incorporated into the ATM system to perform intermediate signal processing on each incoming ATM cell prior to reaching the ATM switch 10. In particular, each incoming ATM cell is individually processed by a respective cell alignment unit such as exemplary unit 11 in order to align the cell within a prespecified time slot of the ATM switch. The cell alignment unit assigned to a respective ATM cell operates independently of the other alignment units. Before proceeding with a discussion of the specific implementation of the cell alignment unit, the signal diagrams in FIGS. 2–3 are presented to illustrate the problem of cell alignment and how the present invention treats and corrects such misalignments.

Figure 2:
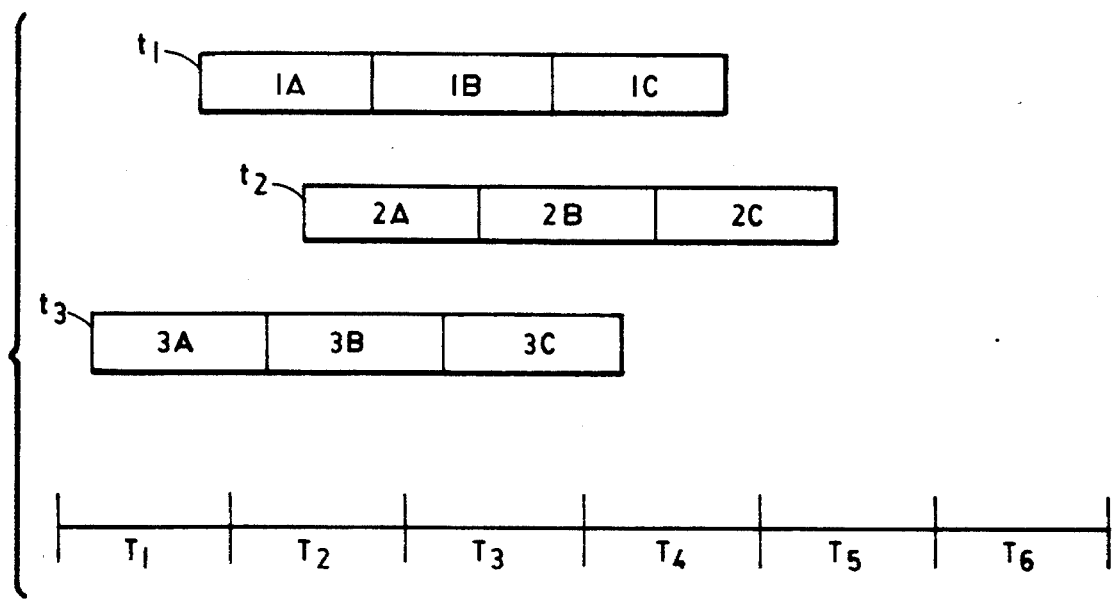
FIG. 2 shows a sequence of ATM cells to illustrate cell misalignment.

FIG. 2 shows a sequence of incoming ATM cells in comparison to the internal time slot of the ATM switch for illustrating cell misalignment. As noted above, incoming ATM cells arrive at the ATM matrix at arbitrary times and accordingly are not likely to be time-correlated with the internal time slots of the matrix. Thus, if no correction is made to the arrival times of the ATM cells, these cells will overlap consecutive time slots rather than appearing entirely within a single slot. Each cell must therefore be aligned properly with the internal time slots of the ATM matrix, thus avoiding cell fragmentation as the matrix begins its switching operation.

FIG. 2 shows three incoming cell sequences each including three ATM cell units and arriving on respective input lines at distinct times $t_1$, $t_2$, and $t_3$. On input one, for example, a sequence of cells 1A-1B-1C arrives from a signal generation facility such as the PSTN. As indicated, the lead cell 1A arrives at time $t_1$. Similarly, cells 2A-2B-2C on input two begin arriving at time $t_2$, while cells 3A-3B-3C on input three begin arriving at time $t_3$. It is clear from these signal diagrams that none of the cell sequences is aligned completely within any of the time slots $T_1$–$T_6$ of the ATM switch. For example, at input two, cell 2A bridges slots $T_2$ and $T_3$, cell 2B bridges slots $T_3$ and $T_4$, and cell 2C overlaps slots $T_4$ and $T_5$. Accordingly, if these cell sequences were presented to the ATM switch with such misalignment, cell fragmentation would occur. As a result of such fragmentation, the front portion of cell 2A would be switched during slot $T_2$, leaving the remaining trailing portion to be switched during the next slot $T_3$. This mode of switching is contrary to ATM system operation in which the entire cell remains intact while being transferred through the ATM matrix.

Figure 3:
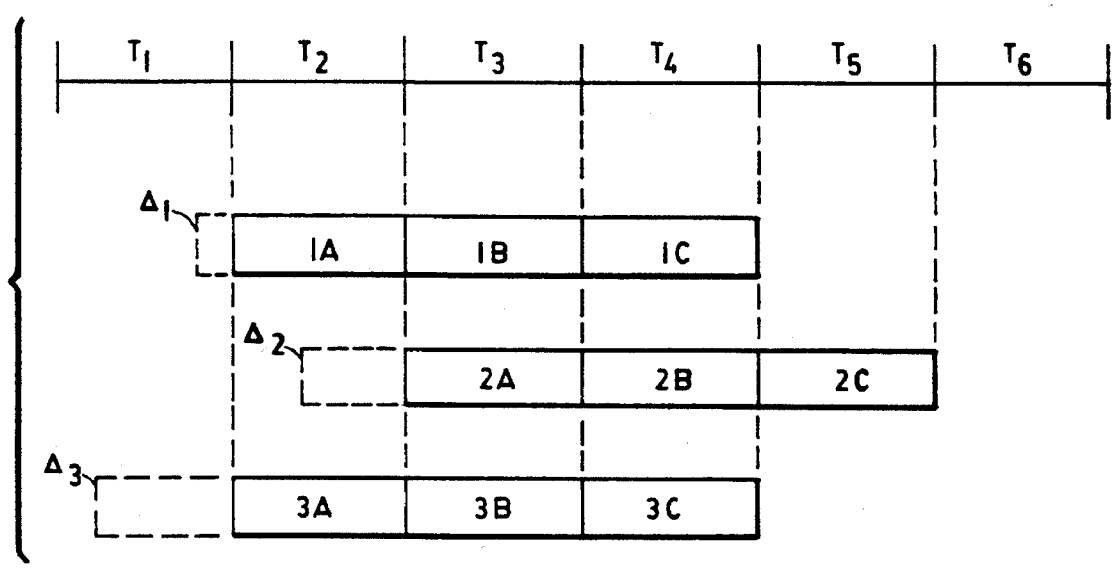
FIG. 3 shows the ATM cell sequences of FIG. 2 after cell alignment according to the present invention.

FIG. 3 illustrates the new alignment of each cell sequence after processing by a respective cell alignment unit. Briefly, exemplary alignment unit 11 determines whether an incoming cell is misaligned with the timing of the ATM switch and, if so, delays transmission of the cell to the ATM switch by an appropriate time interval so that the cell is presented to the switch at a time coincident with a switching interval.

As indicated in FIG. 3, cell alignment in accordance with the present invention places each cell entirely within a certain one of the time slots $T_1$–$T_6$. For example, cell sequence 1A-1B-1C is delayed by interval $\Delta_1$, thus aligning cells 1A, 1B, and 1C within time slots $T_2$, $T_3$, and $T_4$, respectively. Similarly, cell sequence 2A-2B-2C becomes aligned within slots $T_3/T_4/T_5$, respectively, after a delay of $\Delta_2$, while sequence 3A-3B-3C becomes aligned within slots $T_2/T_3/T_4$, respectively, after a delay of $\Delta_3$ imposed by the cell alignment unit 11.

Figure 4:
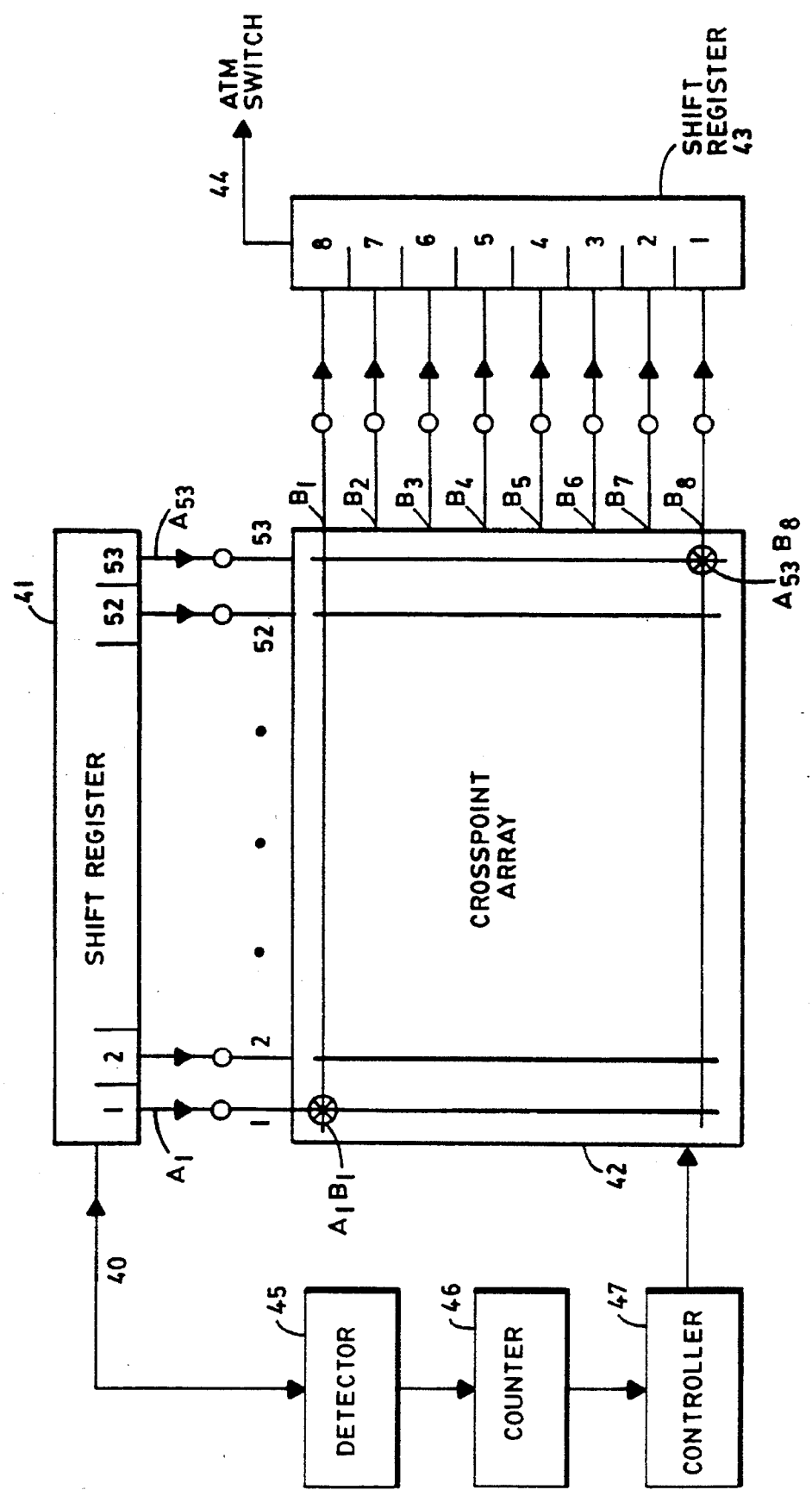
FIG. 4 schematically illustrates the ATM cell alignment apparatus in accordance with the present invention.

FIG. 4 is a block diagram representation of the component configuration for each of the cell alignment units in FIG. 1. The alignment unit includes two levels of delay imposable upon an ATM cell entering the unit. In particular, the unit implements a time-delay by using a first shift register 41 adapted to receive an incoming cell on input line 40, and a second shift register 43 furnishing the time-delayed cell on output line 44. The shift registers are interconnected via a crosspoint array As a general principle of design, the crosspoint switching array 42 connects any one of a plurality of M inputs to any one of a plurality of N outputs employing a matrix of M×N crosspoint switching means arranged in M columns by N rows. A switching means is located at each crosspoint of the array for connecting one of the M columns with one of the N rows. In particular, any one of the M input ports can be connected to any one of the N output ports by activating the appropriate one of the crosspoint switching means. Each switching means includes a control input means adapted to receive control signals for placing the switching means in an activated or deactivated state. A feature of array 42 is that it is easily reconfigurable in response to a new set of control signals applied to the control input means of the crosspoint switching means. An exemplary array is disclosed in U.S. Pat. No. 4,818,988 to Cooperman et al., herein incorporated by reference.

The alignment unit is specifically configured with a multibyte-wide serial-to-parallel shift register 41 having a serial input 40 and a plurality of parallel outputs. The first output of each byte of register 41 is coupled to a respective one of the plurality of M input lines of crosspoint array 42. The alignment unit is further configured with a parallel-to-serial shift register 43 having a plurality of parallel inputs and one serial output 44. Each parallel input of register 43 is coupled to a respective one of the plurality of N output lines of crosspoint array 42.

As can be ascertained from FIG. 4, the delay experienced by a digital signal as it is shifted through register 41, switched by crosspoint array 42, and shifted through register 43 will depend upon which of the crosspoint switching means of array 42 is activated. During operation, the array 42 is controllably programmed so that for each digital signal being processed by the alignment unit, only a single one of the crosspoint switching means is activated for switching while the remaining switching means are deactivated.

In accordance with the general operation of the alignment unit, a computation is initially performed to calculate the time delay desired for an incoming digital signal. Based on this computed time delay, crosspoint array 42 is configured to establish a switching path from a selected input port to a selected output port through an associated crosspoint switching means activated for switching.

In accordance with a preferred implementation of the alignment unit in FIG. 4, the shift register 41 would be fifty-three (53) bytes wide to accommodate the width (53 bytes) of an ATM cell. Moreover, the output 44 of shift register 43 is coupled to a respective one of the inputs of the FIG. 1 ATM switch 10. Accordingly, the following discussion of the operation of the alignment unit in FIG. 4 relates to an ATM application. However, it should be obvious to those skilled in the art that the alignment unit is not operationally confined to aligning an ATM cell but is adaptable to accommodate any byte sequence by changing the input/output dimensions of the shift registers and crosspoint array As each cell arrives at its respective cell alignment unit, a calculation is performed by a time delay computation means to determine the amount of delay which is necessary to align the cell within a time slot of the ATM switch 10 of FIG. 1. This time delay is expressed as a suitable digital code which functions as a control signal to reconfigure the switch matrix The time delay may be computed, for example, by obtaining the output of a counter circuit which starts counting at the beginning of the internal ATM switch timeslot and stops when the ATM cell arrives at its respective cell alignment unit. In particular, a detection unit may be used to detect the arrival of a synchronization byte in the header portion of an incoming cell. Upon such sync byte detection, the detection unit directs the counter circuit to cease counting.

In the serial-input/parallel-output shift register 41, the ATM cell arrives serially on line 40 one bit at a time. An exemplary implementation of the 53-byte-wide register would include a sequence of eight (8) serially-connected D flip-flops in each byte region of the register. The output of the eighth flip-flop in each sequence would be coupled to the input of the first flip-flop in the next adjacent byte region of the shift register. Accordingly, the amount of delay provided by register 40 is equivalent to $[(53\times8)\times\tau]$, wherein $\tau$ is the duration of the clock pulse used to synchronously shift the ATM cell through shift register 41.

Although all fifty-three parallel outputs are simulataneously available to array 42 from shift register 41, only a single one is switchably coupled by array 42 to one of the outputs. In particular, the switch is configurable in response to control signals applied to the crosspoint switching means to establish only a single switching path from a selected input to a selected output.

For illustrative purposes only, the signal output lines from shift register bytes 1 and 53 are designated $A_1$ and $A_{53}$, respectively, to facilitate an understanding of the minimum and maximum delays imposable by crosspoint array The signals on each line correspond to a first bit of the byte being shifted into the respective register location. If the ATM cell arrives at the input of shift register 41 and the computation means determines that no delay is necessary, the array 42 is configured so that the crosspoint $A_1B_1$ at the intersection of input line $A_1$ and output line $B_1$ is activated, thereby switching the digital signal from line $A_1$ to line $B_1$. Thus, the cell is shifted by register 41 and then transferred through crosspoint array 42 without any delay. If, however, it is determined that a delay of fifty-three bytes is necessary, array 42 is configured so that the crosspoint $A_{53}B_8$ at the intersection of line $A_{53}$ and output line $B_8$ is activated. Consequently, as the ATM cell is shifted through register 41 and eventually switched by array 42 from register output line $A_{53}$ to line $B_8$, the cell experiences a delay of [(53×8)× $\beta$], wherein $\beta$ is the clocking interval of the shift register 41.

The alignment unit shown illustratively in FIG. 4 implements an additional level of delay with parallel-to-serial shift register 43. In particular, depending upon which of the eight outputs $B_1$–$B_8$ of crosspoint array 42 is connected to shift register 43, a delay of one to eight times the shift clock pulse may be imposed upon the digital signal. For example, if array 42 switchably couples one of its inputs to output $B_8$, shift register 43 will impose an additional delay of eight times the clock period since it will take eight clock periods for the bit value in register location one (1) to propagate (e.g., shift) through register 43 and reach register location eight (8) where the digital value is shifted onto line 44 and coupled to the ATM switch. Similarly, if array 42 switchably couples an input to output $B_1$, the digital value shifted into register location eight (8) will only experience an additional delay of one clock period before being shifted onto line 44.

The actual minimum delay is two (2) bit periods (one unit of delay from both register 41 and 43; switching at crosspoint $A_1B_1$), although the relative delay can be varied over the entire range of 53×8 bit periods depending upon which switching means in array 42 is activated. However, the 2-bit minimum delay may be compensated for with the time delay computation means described supra.

There may also be included detection means 45 for detecting the presence of an ATM cell on the input line 40, counter means 46 for computing the time elapsed between a reference time and when the ATM input cell is detected, and control means 47 for encoding the computed time into a digital code suitable for programming the programmable switch array 42.

What has been shown and described herein is a signal processing unit having particular application in an ATM environment for aligning an incoming ATM cell with the internal time slot of an ATM switch. The alignment function delays the cell by an appropriate amount and occurs prior to switching so that the entire ATM cell byte sequence is switched within the same ATM switch time slot, thereby avoiding cell fragmentation.

While there has been shown and described herein what are presently considered the preferred embodiments of the invention, it will be obvious to those skilled in the art that various changes and modifications can be made therein without departing from the scope of the invention as defined by the appended claims.

I claim:

1. An apparatus comprising:

a serial-to-parallel shift register having a serial input and a plurality of parallel outputs;

a crosspoint switching array having a plurality of inputs each coupled to a respective one of the shift register outputs, a plurality of outputs, and a plurality of crosspoint switching means arranged in a matrix for selectably connecting any one of one of said plurality of array inputs to any one of said plurality of array outputs:

a parallel-to-serial shift register having a plurality of parallel inputs each coupled to a respective one of the crosspoint switching array outputs, and serial output;

wherein the serial-to-parallel shift register includes fifty-three (53) byte register locations;

said crosspoint switching array has fifty-three (53) inputs and eight (8) outputs; and the parallel-to-serial shift register includes eight (8) bit register locations.

2. In an Asynchronous Transfer Mode (ATM) system comprising an ATM switch having a plurality of inputs each adapted to receive a respective ATM input cell, and a plurality of cell alignment means each having an input coupled to receive a respective ATM cell and having an output coupled to a respective ATM switch input, each cell alignment means comprising:

a serial-to-parallel shift register having a serial input coupled to receive an ATM cell, and a plurality of parallel outputs;

a crosspoint switching array having a plurality of inputs each coupled to a respective one of the shift register outputs, a plurality of outputs, and a plurality of crosspoint switching means arranged in a matrix for selectably connecting any one of said plurality of array inputs to any one of said plurality of array outputs; and a parallel-to-serial shift register having a plurality of parallel inputs each coupled to a respective one of the crosspoint switching array outputs, and a serial output coupled to a respective ATM switch input.

3. The cell alignment means as recited in claim 2 wherein:

the serial-to-parallel shift register includes fifty-three (53) byte register locations;

said crosspoint switching array has fifty-three (53) inputs and eight (8) outputs; and the parallel-to-serial shift register includes eight (8) bit register locations.

4. An apparatus for delaying an ATM input cell arriving on an input line, comprising:

first shift register means for serially shifting the ATM input cell and providing shifted signals as outputs;

a second shift register means for shifting out parallel inputs in serial; and programmable switch array means for programmably switching one of the shifted signals to a respective parallel input of said second shift register means;

detection means for detecting the presence of an ATM cell on the input line;

counter memos for computing the time elapsed between a reference time and when the ATM input cell is detected; and control means for encoding the computed time into a digital code suitable for programming said programmable switch array means.

* * * * *